UNITED STATES PATENT OFFICE.

ARTHUR W. SWANBERG, OF MINNEAPOLIS, MINNESOTA, ASSIGNOR TO WALDO B. BERRYMAN, OF LIMA, OHIO.

LEAK-PROOF COMPOSITION FOR TIRES.

1,326,007.     Specification of Letters Patent.     Patented Dec. 23, 1919.

No Drawing.     Application filed May 20, 1918. Serial No. 235,706.

*To all whom it may concern:*

Be it known that I, ARTHUR W. SWANBERG, a citizen of the United States, and a resident of Minneapolis, in the county of Hennepin and State of Minnesota, have invented a certain new and useful Leak-Proof Composition for Tires; and I do hereby declare the following to be a full, clear, and exact description of the invention, such as will enable others skilled in the art to which it appertains to make and use the same.

My invention relates to compositions for filling cracks, spaces and holes that may be formed in the inner tube of pneumatic tires, such as automobile tires. It also has for its object to provide a preservative composition which will produce and cause the rubber to maintain its flexible condition and thus preserve it from deterioration.

The composition may be formed of a number of ingredients which have effects equivalent to the ingredients contained in a preferred form of composition or embodiment of the invention. Likewise, the proportionate amounts of the ingredients may be varied to some extent without materially varying the results of the composition or of the effect of the ingredients in their interrelation in the composition.

In forming the composition, the material which is known in some trades as mineral wool is used. The mineral wool that I prefer to use in my composition is that formed from slag by processes well known in the art. The mineral wool is subjected to heat from 300 to 600° C. to prevent balling the composition which otherwise occurs when the composition is prepared and inserted in the tires. The fibrous material is torn and broken and then screened to remove all silica globules that are found in the material. The larger fibers are broken by being forced through the screen. It may be rubbed on the screen and thus worked in through the mesh. The material thus formed is then mixed with a mixture of gelatin and soap. The mixture of gelatin and soap is prepared by using preferably a very fine powdered glue and powdered soap of any kind. The glue and soap is mixed together in quantities by weight of two of the glue to one of the soap. The soap prevents the glue from becoming hard and forming a hard coating on the surface of the rubber when the composition is inserted in the tire. The mixture of glue and soap forms a vehicle for the pulverized wool. When water is added to the composition preparatory to its being inserted in the tire, that is the inner tube, it is thoroughly mixed with the pulverized wool, gelatin and the soap. Agitation of the mixture produces an emulsion of uniform consistency that will be maintained practically throughout the life of the inner tube. By reason of the fact that the mixture fills all of the pores and the small openings that may be formed by tacks and nails and the like, the life of the inner tube is greatly increased in length.

In the preferred form of the mixture, the pulverized mineral wool prepared, as above given, is mixed with a mixture of glue and soap in proportions of 16 of the mineral wool preparation to one of the mixture of powdered glue and soap. The proportion of the prepared mineral wool and the glue and soap, however, may be varied. It is, however, preferable not to use a proportion of not more than 25 of the powdered wool to 1 of the glue and soap mixture and not less than 5 of the prepared mineral wool to 1 of the glue and soap mixture.

In the use of the composition, two ounces of the composition are thoroughly mixed with a quart of water, preferably soft or rain water. The mixture of the composition and water is then inserted into the inner tube which may be done by removing the valve and inserting or forcing the mixture through the stem, whereupon the valve is replaced and air is pumped into the tire and rotated in order to spread the composition over the surface of the inner tube.

In case of puncture of the tire, the composition fills the opening as soon as the tire is turned so as to bring the opening below the composition and the air pressure forces the composition into the opening and to a minute degree into the outer surface of the inner tube and the surface of the casing. The composition thus fills and blocks the opening and is held in the opening by the air pressure. The same is also true in filling the pores of the inner tube and thus renders a porous tube non-porous.

I claim:—

In a composition for filling the walls of tire tubes, a mixture of about 16 parts of mineral wool to one of a mixture of gelatin and soap in proportions of about two of gelatin to one of soap and two ounces of the mixture mixed with a quart of water.

In testimony whereof, I have hereunto signed my name to this specification.

ARTHUR W. SWANBERG.